(12) United States Patent
Takahara

(10) Patent No.: US 11,706,360 B2
(45) Date of Patent: Jul. 18, 2023

(54) IMAGE FORMING APPARATUS CAPABLE OF DISPLAYING SETTING SCREEN CREATED BASED ON OPERATION HISTORY

(71) Applicant: KYOCERA Document Solutions Inc., Osaka (JP)

(72) Inventor: Masakazu Takahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/685,772

(22) Filed: Mar. 3, 2022

(65) Prior Publication Data

US 2022/0294920 A1 Sep. 15, 2022

(30) Foreign Application Priority Data

Mar. 11, 2021 (JP) .................................. 2021-039319

(51) Int. Cl.
*H04N 1/00* (2006.01)
*H04N 1/44* (2006.01)

(52) U.S. Cl.
CPC ....... *H04N 1/00517* (2013.01); *H04N 1/4433* (2013.01)

(58) Field of Classification Search
CPC ............. H04N 1/00517; H04N 1/4433; H04N 1/00185; H04N 1/00129; H04N 1/00236; H04N 1/00326; H04N 1/0035; H04N 1/00411; H04N 1/00795; H04N 1/0097
See application file for complete search history.

(56) References Cited

U.S. PATENT DOCUMENTS

2007/0247665 A1* 10/2007 Rosenfeld .......... H04N 1/00222
358/1.18
2019/0260891 A1 8/2019 Nakajima
2020/0310703 A1* 10/2020 Inoue ................. H04N 1/00175

FOREIGN PATENT DOCUMENTS

JP 2019-144934 A 8/2019

* cited by examiner

*Primary Examiner* — Juan M Guillermety
(74) *Attorney, Agent, or Firm* — IP Business Solutions, LLC

(57) ABSTRACT

A storage device stores an operation history in which at least one of four types of data, picture, graphic, symbol, and keyword, in a first data set used in image formation on a sheet by the image forming device is associated with a setting data set manipulated by a user during the image formation. An image reading device reads an original document for use in forming an image and generates a second data set. A comparator compares at least one of the four types of data in each of the stored first data sets with at least corresponding one type of data in the second data set and selects the first data set consistent with the second data set. A screen creator uses the setting data set associated with the selected first data set to create a setting screen for image formation. A display device displays the created setting screen.

5 Claims, 5 Drawing Sheets

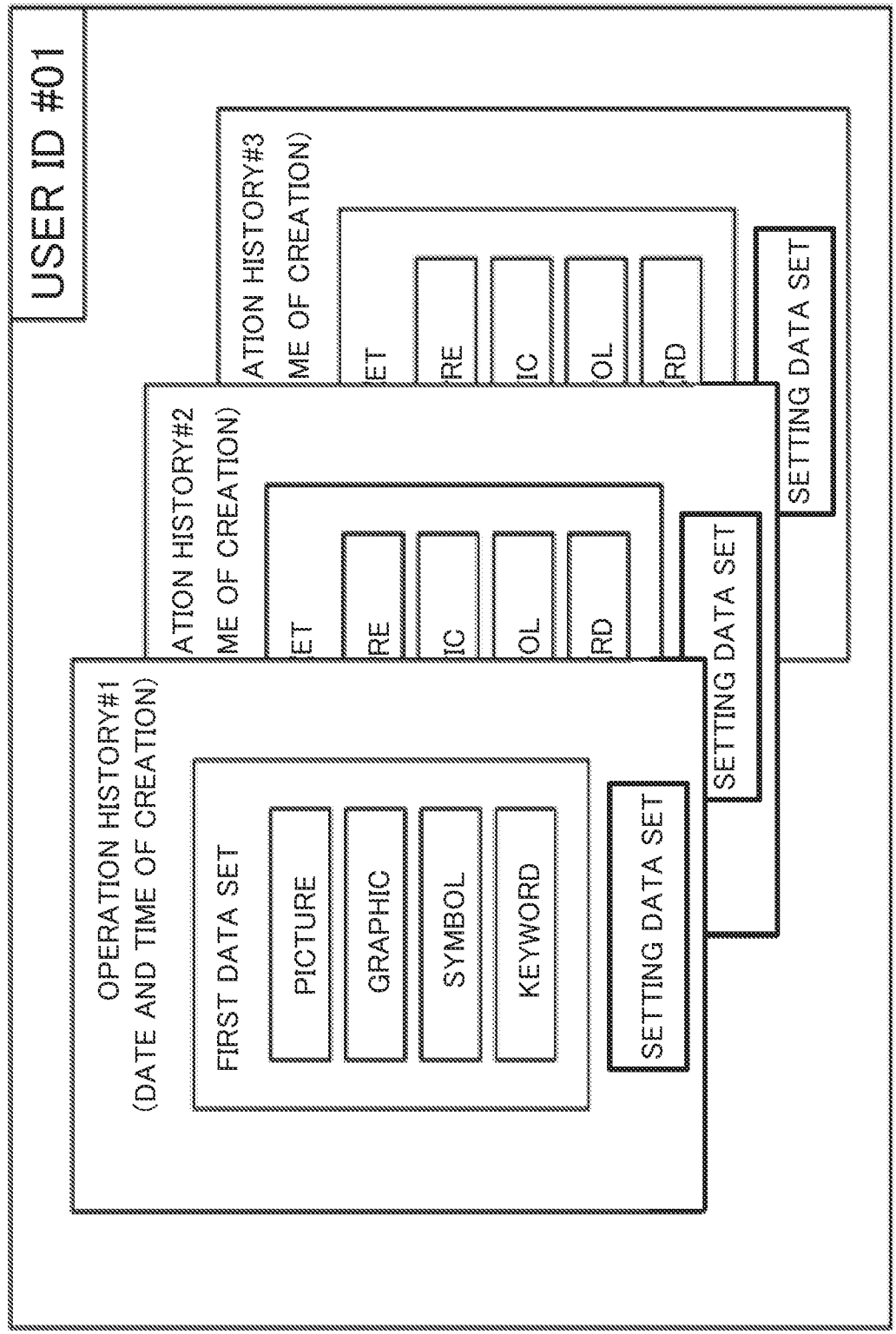

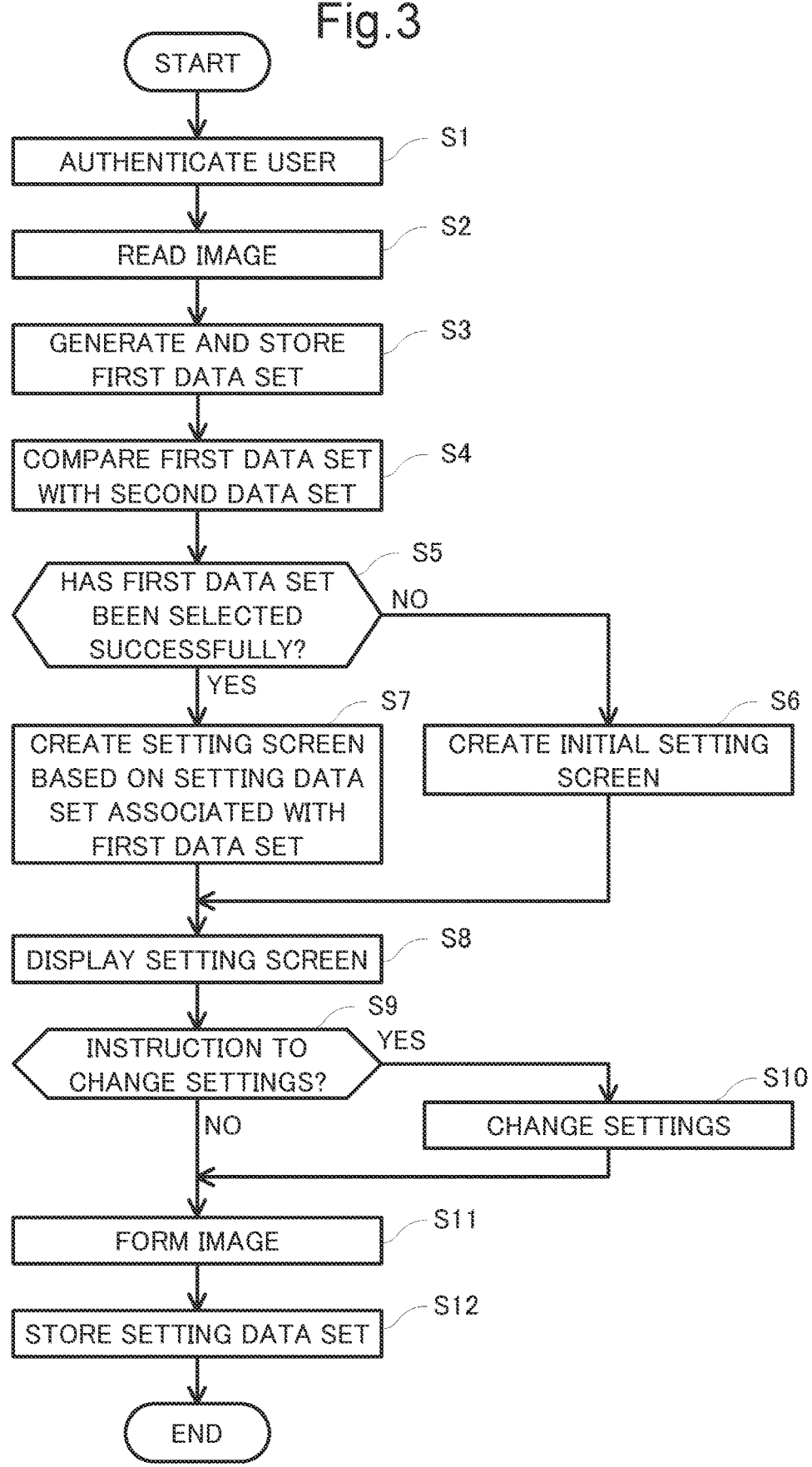

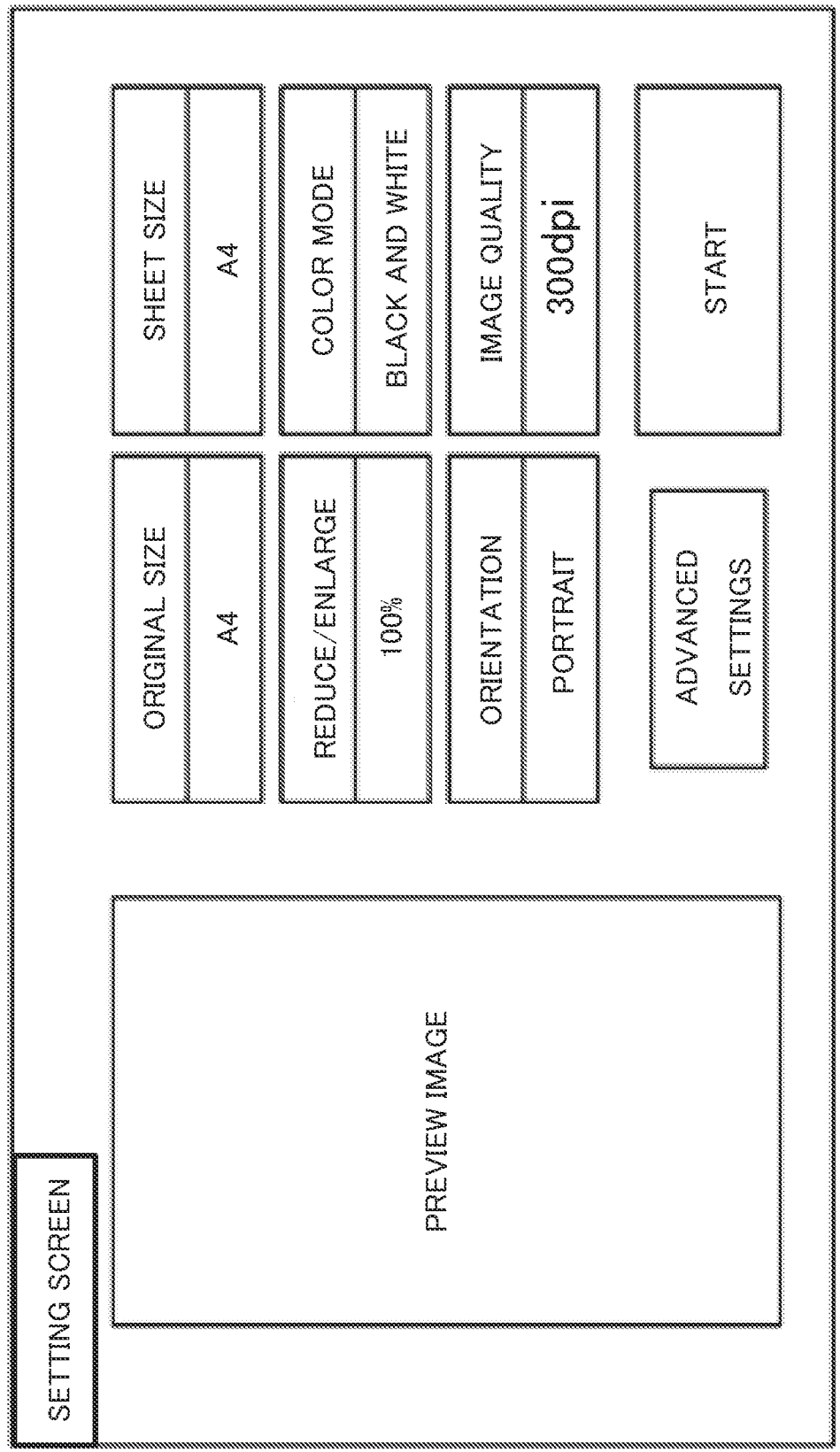

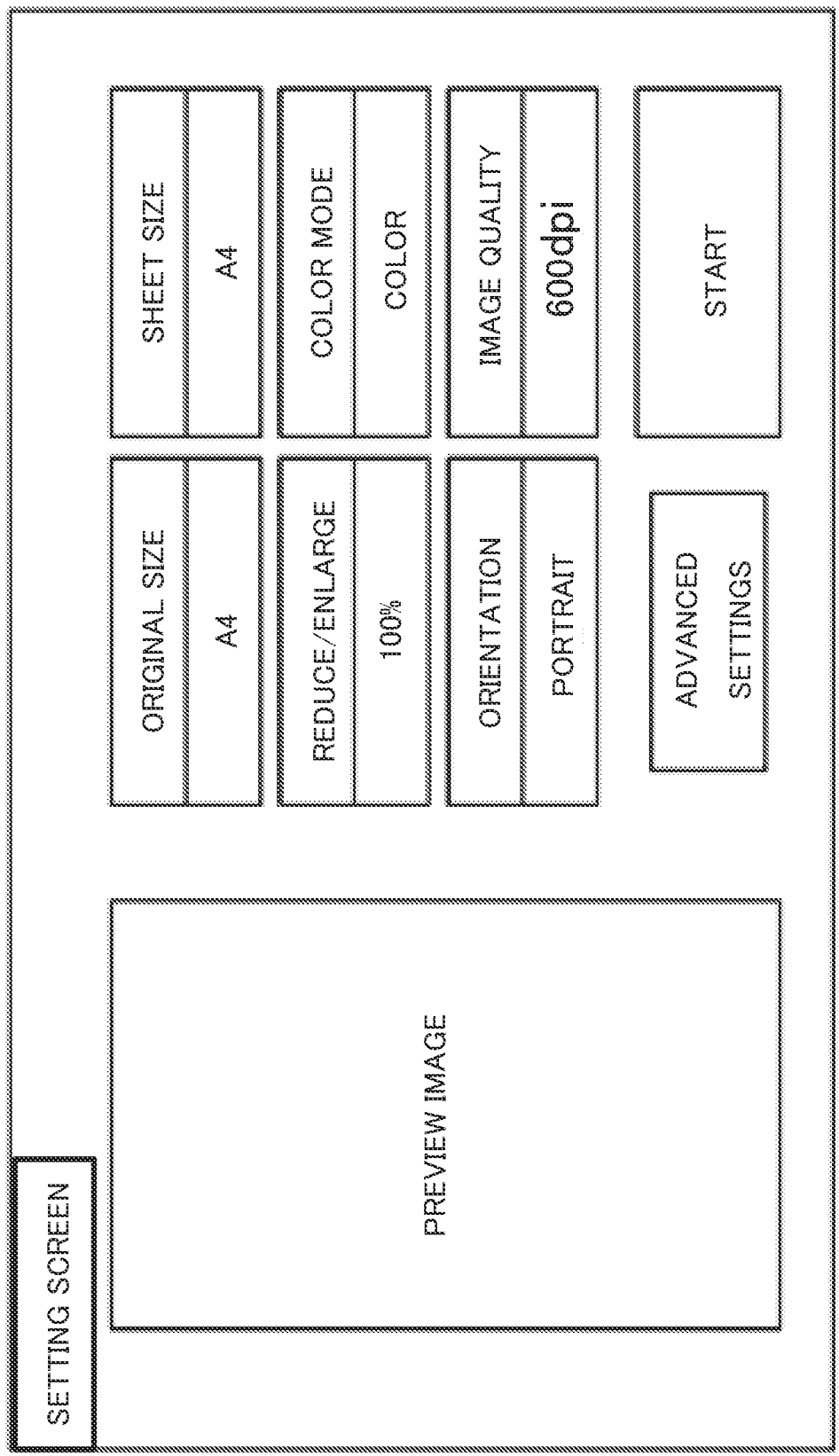

IMAGE FORMING APPARATUS CAPABLE OF DISPLAYING SETTING SCREEN CREATED BASED ON OPERATION HISTORY

INCORPORATION BY REFERENCE

This application claims priority to Japanese Patent Application No. 2021-039319 filed on Mar. 11, 2021, the entire contents of which are incorporated by reference herein.

BACKGROUND

The present disclosure relates to image forming apparatuses.

An image forming apparatus is disclosed that assists a user's operation by reading a history of past operations of the user from a storage device and displaying on a touch panel display a setting screen based on the read operation history.

SUMMARY

A technique improved over the aforementioned technique is proposed as one aspect of the present disclosure.

An image forming apparatus according to an aspect of the present disclosure includes an image forming device, a storage device, an image reading device, a control device, and a display device. The image forming device forms an image on a sheet. The storage device stores an operation history in which at least one of four types of data, picture, graphic, symbol, and keyword, contained in a first data set used in forming the image on the sheet by the image forming device is associated with a setting data set manipulated by a user during formation of the image on the sheet. The image reading device reads an original document for use in forming an image and generates a second data set on the read original document. The control device includes a processor and functions, through the processor executing a control program, as a comparator, a screen creator, and a controller. The comparator makes a comparison between at least one of four types of data, picture, graphic, symbol, and keyword, contained in the second data set generated by the image reading device and at least one of the four types of data, picture, graphic, symbol, and keyword, contained in each of the first data sets stored in the storage device and selects the first data set consistent with the second data set. The screen creator uses the setting data set associated with the first data set consistent with the second data set to create a setting screen for use in accepting an instruction to set image formation details for formation of the image using the second data set. The controller allows the display device to display the setting screen created by the screen creator.

BRIEF DESCRIPTION OF THE DRAWINGS

FIG. 2 is a view showing examples of operation histories stored in a storage device in Embodiment 1.

FIG. 3 is a flowchart showing an example of operation of the image forming apparatus according to Embodiment 1.

FIG. 4 is a view showing an example of an initial setting screen created based on an initial setting data set in Embodiment 1.

FIG. 5 is a view showing an example of a setting screen created based on a setting data set of an operation history in Embodiment 1.

DETAILED DESCRIPTION

Figure 1:
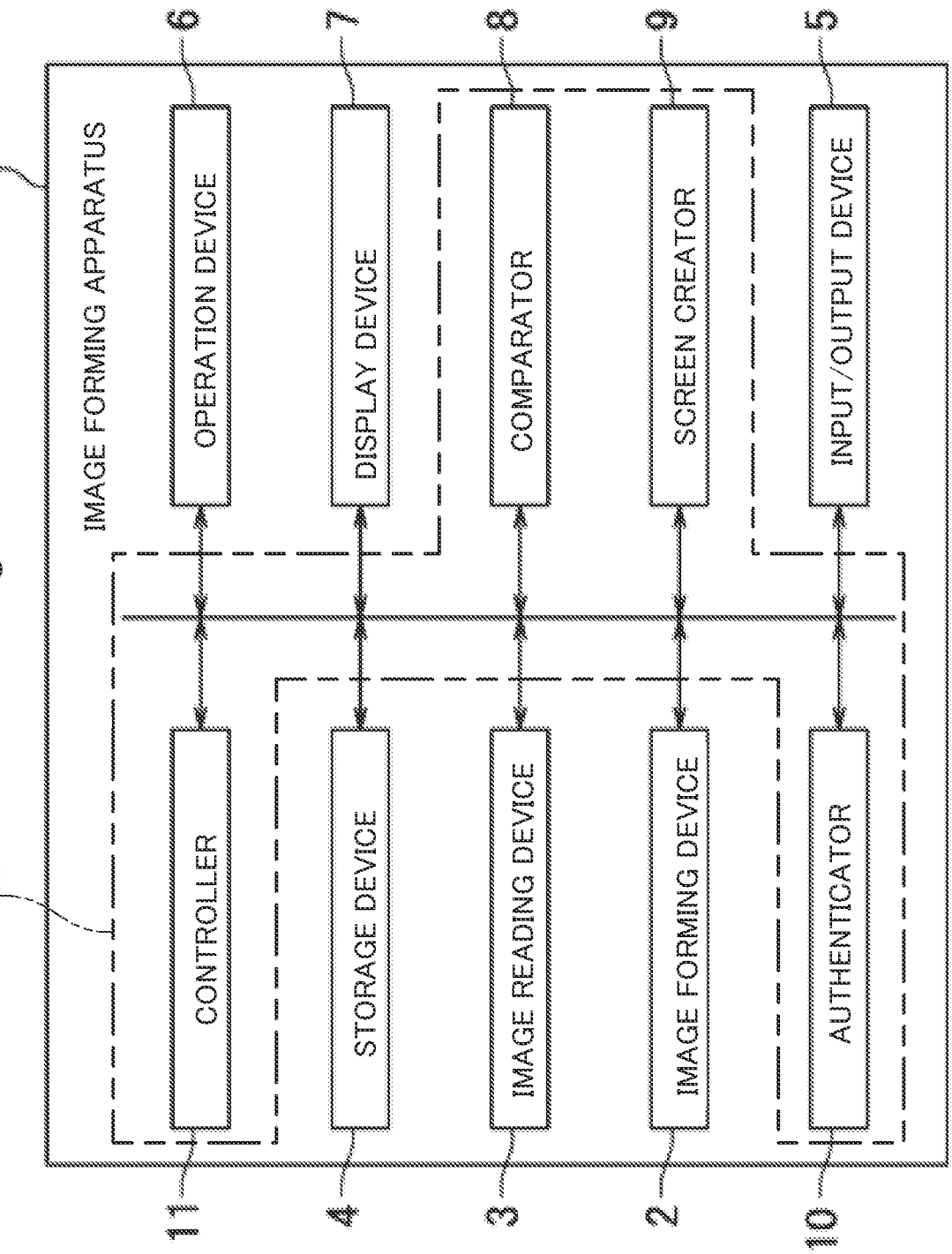
FIG. 1 is a block diagram showing the configuration of an image forming apparatus according to Embodiment 1.

Hereinafter, a description will be given of an embodiment of the present disclosure with reference to the drawings. Throughout the drawings, the same or corresponding parts are designated by the same references and further explanation thereof will be omitted.

Embodiment 1

With reference to FIGS. 1 to 5, an image forming apparatus 1 according to Embodiment 1 will be described below. FIG. 1 is a block diagram showing the configuration of the image forming apparatus 1 according to Embodiment 1.

The image forming apparatus 1 includes an image forming device 2, an image reading device 3, a storage device 4, an input/output device 5, an operation device 6, a display device 7, a comparator 8, a screen creator 9, an authenticator 10, and a controller 11.

The image forming device 2 forms an image on a sheet, using data containing a text, a picture, and/or so on. The data used in forming the image is described as a "first data set". The first data set is a data set received through the input/output device 5 from an external device. Alternatively, the first data set may be image data read from an original document by the image reading device 3.

The image reading device 3 reads an original document and generates image data on the original document. The image reading device 3 may perform OCR (optical character recognition) processing on the image data generated by reading the original document. The data generated by the image reading device 3 is described as a "second data set".

The storage device 4 is a storage medium, such as an HDD (hard disk drive) or a RAM (random access memory). The storage device 4 stores an operation history in which at least one of four types of data, picture, graphic, symbol, and keyword, contained in the first data set used in forming the image by the image forming device 2 is associated with a setting data set manipulated by a user during formation of the image. This embodiment assumes that all the four types of data, picture, graphic, symbol, and keyword, contained in the first data set are stored in association with the operation history. The storage device 4 may store an operation history on a user-by-user basis. In this case, for example, the storage device 4 stores the operation history in association with user identification information or the like indicating a user authenticated by the authenticator 10. The controller 11 to be described hereinafter allows the storage device 4 to store the operation history, the first data set, and the user identification information.

Although the example shown in FIG. 1 is a system in which the storage device 4 is contained in the image forming apparatus 1, there may be a system built so that the storage device 4 is external to the image forming apparatus 1. In such a system built so that the storage device 4 is external to the image forming apparatus 1, the image forming apparatus 1 accesses the external storage device 4 through the input/output device 5. In this system, for example, the external storage device 4 is built as a server on a network. In this case, the server serving as the external storage device 4 on the network is considered to constitute a part of the image forming apparatus 1.

FIG. 2 is a view showing examples of operation histories stored in the storage device 4 in Embodiment 1. In the examples shown in FIG. 2, the storage device 4 stores Operation Histories #1, #2, and #3 on image formation performed in the past by a user identified by User ID #01. User ID corresponds to user identification information. Each operation history contains a first data set and a setting data set. Each operation history may further contain a date and time of creation when the operation history has been created.

The first data set is a data set representing a text, a picture or so on used in a past image formation operation of the user and contains at least one of four types of data: picture, graphic, symbol, and keyword. A picture contained in the first data set corresponds to a picture formed on a sheet. A symbol contained in the first data set is, for example, a symbol frequently appearing in the first data set. Likewise, a keyword contained in the first data set is, for example, a character string frequently appearing in the first data set. As an example, in this embodiment, ten character strings in descending order of frequency of appearance are stored as keywords for a single first data set. Alternatively, in addition to or instead of the character strings appearing with high frequency, character strings used in headlines of chapters, sections, paragraphs, and so on may be extracted as keywords contained in the first data set. Although in the examples shown in FIG. 2 four types of data, picture, graphic, symbol, and keyword, are stored as a first data set, it is sufficient to store at least one type of data, picture, graphic, symbol or keyword. The types of data to be stored as a first data set may be previously set for the image forming apparatus 1 or may be able to be set or changed by the user or the like.

The setting data set contains setting items representing image formation details used in past image formation operations of the user and the respective values (settings) of the setting items. For example, when the user sets the color mode to black and white in forming an image, a setting item "Color Mode" and a setting "Black and White" are stored as pieces of a setting data set in the storage device 4.

The input/output device 5 serves as various types of interfaces, such as a network interface, a parallel interface, and a USB (universal serial bus) interface. The input/output device 5 sends and receives data to and from external devices, using predetermined protocols. For example, the input/output device 5 receives from an external device a first data set for use in the formation of an image by the image forming device 2. The external devices include, not only a server described above, but also a personal computer, a tablet, and a smartphone.

The operation device 6 includes a keyboard and a touch panel. For example, the operation device 6 accepts user's operations, such as an instruction to execute image formation and an input of settings for image formation.

The display device 7 is a display. The touch panel serving as the operation device 6 may be attached to the surface of the display serving as the display device 7. The display device 7 displays a setting screen on image formation, a preview image, and so on.

The control device 100 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit). The control device 100 includes a controller 11, a comparator 8, a screen creator 9, and an authenticator 10.

When the above processor operates in accordance with a control program stored in an unshown HDD (hard disk drive), an SSD (solid state drive) or the like, the control device 100 functions as the controller 11, the comparator 8, the screen creator 9, and the authenticator 10. Alternatively, each of the controller 11 and the other components of the control device 100 may not be implemented by the operation of the processor in accordance with the control program, but may be constituted by a hardware circuit. Hereinafter, the same applies to the other embodiments unless otherwise stated.

The controller 11 controls the operations of the image forming device 2, the image reading device 3, the storage device 4, the input/output device 5, the operation device 6, the display device 7, the comparator 8, the screen creator 9, and the authenticator 10. At the time when the image forming device 2 receives a first data set for use in forming an image, for example, in a format for an application, such as a word processor or a spreadsheet, the controller 11 analyzes this data set and extracts pictures, graphics, symbols, and characters constituting the data set. When the first data set for use in the formation of an image by the image forming device 2 is constituted by a picture, the controller 11 extracts the picture. The controller 11 calculates the respective frequencies of appearance of the extracted pictures, graphics, symbols, and characters (a picture only when the first data set is constituted by a picture only) and determines, based on the frequencies of appearance, a picture, a graphic, symbols, and keywords to be stored as a first data set together with a setting data set in the storage device 4. Furthermore, the controller 11 performs, for example, OCR (optical character recognition) processing on a second data set read by the image reading device 3 to extract pictures, graphics, symbols, and characters constituting the second data set.

The second data set is a data set corresponding to an original document which has been read by the image reading device 3 and an image of which the user is about to form. A picture contained in the second data set corresponds to a picture formed on the original document. The symbols and keywords contained in the second data set are symbols and character strings appearing with high frequency or character strings or the like used in headlines, extracted from the second data set by the controller 11 under the same conditions as in the extraction of symbols and character strings from the first data set or extraction of character strings or the like in headlines from the first data set.

The comparator 8 makes, based on the above picture, graphic, symbols, and keywords extracted by the controller 11 from the second data read by the image reading device 3, a comparison between at least one of four types of data, picture, graphic, symbol, and keyword, contained in the second data set and at least corresponding one of four types of data, picture, graphic, symbol, and keyword, contained in a first data set of each of the operation histories stored in the storage device 4. As a result of the comparison, the comparator 8 selects, from first data sets stored in the storage device 4, a first data set consistent with the second data set (i.e., a first data set identical in all targets for comparison with the second data set). When first data sets are stored on a user-by-user basis, the comparator 8 performs the above comparison toward only the first data sets related to the user who is about to execute an image formation operation and has been authenticated by the authenticator 10.

The screen creator 9 acquires from the storage device 4 a setting data set associated with a first data set selected by the comparator 8. The screen creator 9 uses the setting data set acquired from the storage device 4 to create a setting screen to be displayed on the display device 7. The setting screen is a screen for use in accepting an instruction to set image formation details for formation of an image using a second data set. In addition, the screen creator 9 creates a preview image by reflecting the setting data set acquired from the storage device 4 on the second data set read by the image reading device 3 to process the second data set in accordance with the setting data set. The screen creator 9 creates the setting screen inclusive of the created preview image.

The authenticator 10 performs processing for authenticating a user who intends to execute an image formation operation. For example, an unshown IC (integrated circuit) card reader included in the image forming apparatus 1 reads, from an IC card owned by the user, user identification information registered in the IC card. The authenticator 10 receives the read user identification information from the IC card reader and determines whether or not the read user identification information matches user identification information previously stored in the storage device 4 and representing a legitimate user. When the read user identification information matches the stored user identification information, the authenticator 10 authenticates the user indicated by the read user identification information as the legitimate user. However, the method for authenticating the user is not limited to the above method.

Next, with reference to FIGS. 3 to 5, the operation of the image forming apparatus 1 will be described. FIG. 3 is a flowchart showing an example of operation of the image forming apparatus 1 according to Embodiment 1. The following description assumes that Operation Histories #1, #2, and #3 shown in FIG. 2 are stored in the storage device 4.

In step S1, the authenticator 10 authenticates a user and notifies the controller 11 of the user identification information on the authenticated user. In this case, it is assumed that a user corresponding to "User ID #01" has been authenticated.

Subsequently, the user authenticated by the authenticator 10 operates the operation device 6 to input an instruction to read an original document that the user intends to copy. In doing so, the user does not make an operation for inputting an instruction to execute the formation of an image, but instead makes only an operation for inputting an instruction to read an original document in preparation for copying. The operation device 6 accepts the input instruction. The controller 11 follows the instruction accepted by the operation device 6 to instruct the image reading device 3 to read an image of the original document. The image reading device 3 follows the instruction from the controller 11 to read the original document and generate a second data set (step S2). The controller 11 extracts, from the second data set read by the image reading device 3, a picture, a graphic, symbols, and keywords in the manner described previously.

In step S3, the controller 11 sets the picture, graphic, symbols, and keywords extracted from the second data set as pieces of a first data set and allows the storage device 4 to store the pieces of a first data set and the date and time of creation (for example, a current date and time) as "Operation History #4" for "User ID #01". In other words, the controller 11 creates a new operation history on the current image formation operation using the second data set and allows the storage device 4 to additionally store this operation history.

In step S4, the controller 11 instructs the comparator 8 to make a comparison between the second data set generated by the image reading device 3 and each of the first data sets stored in the storage device 4. However, the comparator 8 does not use as a target for comparison the first data set of the new operation history stored in step S3. The comparator 8 follows the instruction from the controller 11 to compare the extracted four types of data, picture, graphic, symbol, and keyword, contained in the second data set with the four types of data, picture, graphic, symbol, and keyword, contained in each of the first data sets of the past operation histories stored in the storage device 4, for example, Operation Histories #1, #2, and #3. The comparator 8 determines whether or not it is possible to select a first data set consistent with the second data set from among the first data sets of the past Operation Histories #1, #2, and #3 stored in the storage device 4.

When the comparator 8 successfully selects a first data set consistent with the second data set (Yes in step S5), i.e., when there is a first data set consistent with the second data set, the processing in the controller 11 goes to step S7. When the controller 8 fails to select a first data set consistent with the second data set, i.e., there is no first data set consistent with the second data set (No in step S5), the processing in the controller 11 goes to step S6.

Alternatively, in step S4, the comparator 8 may make a determination of whether or not there is a first data set consistent with the second data set in the following manner. When there is no first data set consistent with the second data set, the comparator 8 calculates the degree of similarity between each of the first data sets of Operation Histories #1, #2, and #3 stored in the storage device 4 and the second data set. In this relation, a higher degree of similarity means that the first data set and the second data set are more similar to each other, while a lower degree of similarity means that the first data set and the second data set are more different from each other. For example, the comparator 8 calculates the degree of similarity by comparing the picture in the first data set with the picture in the second data set. In this case, the comparator 8 calculates the degree of similarity between both the pictures, for example, based on a determination of identity between them using pattern matching. The comparator 8 also calculates the degree of similarity by comparing the graphic in the first data set with the graphic in the second data set. The comparator 8 also calculates the degree of similarity by comparing the set of symbols in the first data set with the set of symbols in the second data set. The comparator 8 also calculates the degree of similarity by comparing the set of keywords in the first data set with the set of keywords in the second data set. Then, the comparator 8 adds up the degree of similarity between the pictures, the degree of similarity between the graphics, the degree of similarity between the sets of symbols, and the degree of similarity between the sets of keywords and selects a first data set having a highest total degree of similarity.

Alternatively, the comparator 8 adds respective values indicating a predetermined weight to picture item, a predetermined weight to graphic item, a predetermined weight to symbol item, and a predetermined weight to keyword item to the respective degrees of similarity between the pictures, between the graphics, between the sets of symbols, and between the sets of keywords and sets the added values as the respective degrees of similarity between the pictures, between the graphics, between the sets of symbols, and between the sets of keywords. Then, the comparator 8 adds up the degree of similarity between the pictures, the degree of similarity between the graphics, the degree of similarity between the sets of symbols, and the degree of similarity between the sets of keywords and selects a first data set having a highest total degree of similarity.

The method for calculating the degree of similarity between the first data set and the second data set is not limited to the above methods.

Alternatively, the comparator 8 may previously set a threshold for the total degree of similarity and select a first data set having a highest total degree of similarity when the total degree of similarity is equal to or larger than the threshold (Yes in step S5), but not select the first data set when the total degree of similarity is smaller than the threshold (No in step S5).

When the comparator 8 fails to select a first data set consistent with the second data set, i.e., when there is not first data set consistent with the second data set (No in step S5), the controller 11 in step S6 instructs the screen creator 9 to create an initial setting screen. The screen creator 9 follows the instruction from the controller 11 to create an initial setting screen, using initial setting screen creation data previously owned by the screen creator 9 and composed of default setting values for setting items representing image formation details. The screen creator 9 may previously store initial setting screen creation data on a user-by-user basis and create an initial setting screen using initial setting screen creation data depending on the authenticated user.

The controller 11 may create a preview image. In this case, the controller 11 outputs to the screen creator 9 the second data set read from the original document by the image reading device 3. The screen creator 9 creates a preview image by reflecting an initial setting data set on the second data set received from the controller 11.

When the comparator 8 successfully selects a first data set consistent with the second data set (Yes in step S5), i.e., when there is a first data set consistent with the second data set, the controller 11 in step S7 outputs to the screen creator 9 a setting data set associated with the first data set selected by the comparator 8. The screen creator 9 uses the setting data set received from the controller 11 to create a setting screen to which the setting values for the items indicated by the setting data set are applied.

The controller 11 may create a preview image. The controller 11 outputs the second data set to the screen creator 9. The screen creator 9 creates a preview image in which the setting data set associated with the first data set selected by the comparator 8 is reflected on the second data set received from the controller 11. The screen creator 9 adds the preview image into the setting screen.

In step S8, the controller 11 allows the display device 7 to display the setting screen created by the screen creator 9 in step S6 or S7.

Here, a description will be given of the setting screen. FIG. 4 is a view showing an example of an initial setting screen created based on initial setting screen creation data in Embodiment 1. FIG. 5 is a view showing an example of a setting screen created based on a setting data set of an operation history in Embodiment 1.

The display image on the setting screens shown in FIGS. 4 and 5 contains setting items including Original Size, Sheet Size, Reduce/Enlarge, Color Mode, Orientation, Image Quality, and so on. Furthermore, the display image also contains respective settings for the setting items. For example, on the initial setting screen in FIG. 4, the initial setting for the setting item "Color Mode" is "Black and White" and the initial setting for the setting item "Image Quality" is "300 dpi". For example, when the user makes an operation for changing the setting from "Black and White" to "Color" on the operation device 6 while the above setting screen is displayed, the setting can be changed. Furthermore, when the user makes an operation for selecting "Advanced Settings" on the operation device 6, the controller 11 follows an instruction input by the operation to allow the display device 7 to switch from the display of the above setting screen to the display of a setting screen in which setting items not shown on the setting screens in FIGS. 4 and 5 are arranged. Moreover, when the user makes an operation for selecting "Start" on the operation device 6, the controller 11 follows an instruction input by the operation to allow the image forming device 2 to execute an image formation to which the values for the items indicated by a setting data set displayed on the setting screen in FIG. 4 or 5 are applied.

The setting screen shown in FIG. 5 is a setting screen based on the values for the items indicated by a setting data set associated with a first data set consistent with the second data set or a first data set most similar to the second data set. For example, the setting for the setting item "Color Mode" is set to "Color" based on the setting data set. Furthermore, the setting for the setting item "Image Quality" is set to "600 dpi" based on the setting data set.

The display image on the setting screens further contains a preview image. The display image on the initial setting screen in FIG. 4 contains a preview image in which a setting data set for creating an initial screen is reflected on the second data set. On the other hand, the display image on the setting screen in FIG. 5 contains a preview image in which a setting data set of an operation history is reflected on the second data set. For example, the original document read by the image reading device 3 in step S2 is displayed in black and white in FIG. 4, while the original document read by the image reading device 3 in step S2 is displayed in color in FIG. 5.

After step S8, the user checks each of the setting items and the preview image on the setting screen being displayed by the display device 7. If there is a problem with any one of the setting items and the preview image, the user makes an operation for changing the settings for the setting items on the operation device 6. In step S9, the operation device 6 accepts an instruction to change the settings according to the operation. When the operation device 6 accepts an instruction to change the settings, i.e., when a setting change is necessary (Yes in step S9), the processing in the controller 11 goes to step S10.

In step S10, the controller 11 follows the instruction to change the settings accepted by the operation device 6 to change the setting data set to the settings indicated by the instruction. The controller 11 generates, based on the second data set, an image based on the values of the items indicated by the changed setting data set and outputs the image to the image forming device 2.

On the other hand, when there is no problem with the setting items and the preview image in step S9, the user makes, on the operation device 6, an operation for selecting "Start" on the setting screen. The operation device 6 accepts an instruction to execute an image formation, based on the operation on "Start". When the operation device 6 accepts an instruction to execute an image formation, i.e., when there is no need for a setting change (No in step S9), the controller 11 does not change the setting data set, generates, based on the second data set, an image based on the values of the items indicated by the setting data set, and outputs the image to the image forming device 2. Thereafter, the processing in the controller 11 goes to step S11.

In step S11, the image forming device 2 forms an image on a sheet, using the above image received from the controller 11.

In step S12, the controller 11 allows the storage device 4 to store the setting data set used in generating the above image, as an operation history for the user for which the controller 11 has allowed the storage device 4 to store an operation history in step S3. In other words, the storage device 4 stores, as "Operation History #4" for "User ID #01", the first data set in step S3 and the setting data set in step S12.

As thus far described with reference to FIGS. 1 to 5, the image forming apparatus 1 according to Embodiment 1 includes the image forming device 2, the storage device 4, the image reading device 3, the comparator 8, the screen creator 9, and the display device 7. The image forming device 2 forms an image on a sheet. The storage device 4 stores an operation history in which at least one of four types of data, picture, graphic, symbol, and keyword, contained in a first data set used in forming the image on the sheet by the image forming device 2 is associated with a setting data set manipulated by a user during formation of the image on the sheet. The image reading device 3 reads an original document for use in forming an image and generates a second data set on the read original document. The comparator 8 compares at least one of four types of data, picture, graphic, symbol, and keyword, contained in the second data set generated by the image reading device 3 with at least one of four types of data, picture, graphic, symbol, and keyword, contained in each of the first data sets stored in the storage device 4 and selects the first data set consistent with the second data set. The screen creator 9 uses the setting data set associated with the first data set consistent with the second data set to create a setting screen for image formation. The display device 7 displays the setting screen created by the screen creator 9. Thus, the image forming apparatus 1 can allow the display device 7 to display a setting screen to which a setting data set associated with a past first data set consistent with the second data set obtained by reading an original document about to be copied by the user is applied. In other words, in forming again an image identical or similar to an image that has been formed on a sheet in the past, the controller 11 can allow the display device 7 to display a setting screen for image formation where the values of the setting items for image formation used for the image having been formed in the past have already been set, and thus assist a copy operation of the user. Furthermore, for a user who is about to copy a completely different original document from those in the past, the controller 11 can allow the display device 7 to display a setting screen where the default values of the setting items for image formation have already been set, and thus prevent the display device 7 from displaying a setting screen where an incorrect operation history is reflected. Hence, an image forming apparatus 1 capable of assisting a user's operation with high accuracy can be provided.

The image forming apparatus 1 includes the authenticator 10 that authenticates a user. The storage device 4 stores an operation history on the basis of each user authenticated by the authenticator 10. The comparator 8 makes the comparison using an operation history for the user authenticated by the authenticator 10. Thus, when the image forming apparatus 1 is shared by a plurality of users, higher-accuracy operation assistance taking into consideration individual user's preference can be achieved.

When there is no first data set consistent with the second data set, the comparator 8 calculates the degree of similarity between each of the first data sets and the second data set. The screen creator 9 uses a setting data set associated with a first data set having a highest degree of similarity to the second data set to create a setting screen. Thus, the image forming apparatus 1 can allow the display device 7 to display a setting screen on which a setting data set associated with a past first data set most similar to the second data set obtained by reading an original document about to be copied by the user is reflected, and thus assist a copy operation of the user. Therefore, for a user who is about to copy a completely different original document from those in the past, the controller 11 can allow the display device 7 to display a setting screen where the default values of the setting items for image formation have already been set, and thus prevent the display device 7 from displaying a setting screen where an incorrect operation screen is reflected. Hence, an image forming apparatus 1 capable of assisting a user's operation with high accuracy can be provided.

The screen creator 9 can be configured to create an initial setting screen when the degree of similarity of the first data set having a highest degree of similarity to the second data set is smaller than a predetermined threshold. Thus, when there is no past first data set having a high degree of similarity to the second data set obtained by reading an original document about to be copied by the user, the image forming apparatus 1 does not perform the above-described assistance for a user's operation. Therefore, for a user who is about to copy a completely different original document from those in the past, the controller 11 can allow the display device 7 to display a setting screen where the default values of the setting items for image formation have already been set, and thus prevent the display device 7 from displaying a setting screen where an incorrect operation screen is reflected. Hence, an image forming apparatus 1 capable of assisting a user's operation with high accuracy can be provided.

The screen creator 9 creates a preview image in which a setting data set is reflected on the second data set, and adds the preview image into the setting screen. The display device 7 displays the setting screen into which the preview image has been added. Thus, the image forming apparatus 1 can clearly show the user whether or not the contents of an image formation operation to be executed by applying the values of the setting items indicated by the setting screen displayed by the display device 7 are matched with the contents intended by the user.

There is known a general image forming apparatus in which, in order to prevent the storage capacity for operation histories from increasing, only frequently used operation histories are saved to a storage, but less frequently used operation histories are deleted. Such an image forming apparatus may display, for example, for a user about to copy a completely different original document from those in the past, a setting screen where an incorrect operation history is reflected, on the ground that the frequency of use of the operation history is high. Unlike this, the above embodiment can provide an image forming apparatus 1 capable of assisting a user's operation with high accuracy.

The above description has been given of an embodiment of the present disclosure with reference to the drawings (FIGS. 1 to 5). However, the present disclosure is not limited to the above embodiment and can be implemented in various forms without departing from the gist of the invention. Modifications 1 to 3 will be described below.

<Modification 1>

If the storage device 4 stores all of past first data sets, the amount of data therein becomes enormous. To cope with this, for example, only when the settings are changed from the initial setting data set, the controller 11 may allow the storage device 4 to store an operation history in which a first data set is associated with the changed setting data set. Alternatively, the controller 11 may refer to the storage device 4 for the dates and times of creation contained in operation histories and delete an old operation history for which a predetermined period of time has passed since its date and time of creation. Still alternatively, the controller 11 may allow the storage device 4 to store only a predetermined number of operation histories and delete an old operation history when the number of operation histories in the storage device 4 exceeds the predetermined number. Still alternatively, the controller 11 may allow the storage device 4 to manage the number of uses of operation histories and delete a less frequently used operation history when the number of operation histories exceeds a predetermined number.

<Modification 2>

Although in Embodiment 1 the comparator 8 selects a single first data set consistent with or having a high degree of similarity to the second data set and the screen creator 9 creates a setting screen using an operation history containing the first data set, the present disclosure is not limited to this manner. For example, the comparator 8 selects a plurality of first data sets having high degrees of similarity to the second data set and the screen creator 9 creates a plurality of respective setting screens using respective operation histories containing the plurality of first data sets. Then, the controller 11 allows the display device 7 to display these plurality of setting screens with priority given to a setting screen based on a first data set having a higher degree of similarity. In other words, the display device 7 first displays a setting screen based on an operation history containing a first data set having a highest degree of similarity. When the user makes an instruction to switch the setting screen on the operation device 6, the controller 11 allows the display device 7 to switch from the above setting screen to a setting screen based on an operation history containing a first data set having a second highest degree of similarity. In this manner, the image forming apparatus 1 can assist a user's copy operation.

Alternatively, the following processing may be adopted. In steps S4 to S8, the comparator 8 selects all of first data sets having a higher degree of similarity to the second data set than a predetermined value, the screen creator 9 creates respective setting screens using respective setting data sets associated with the selected first data sets, and the controller 11 allows the display device 7 to sequentially display the created setting screens in descending order of degree of similarity. Then, the comparator 8 calculates, for each of the displayed setting screens, the respective degrees of similarity in terms of four items, picture, graphic, symbol, and keyword, contained in the first data set used in creating the setting screen, and stores, for each of the displayed setting screens, an item having a highest degree of similarity as a notable item among the items of the setting screen manipulated by the user. In allowing the display device 7 to display the created setting screens next time, the controller 11 allows the display device 7 to sequentially display them in order first from the setting screen created using the first data set having a highest degree of similarity in terms of the notable item stored in the comparator 8.

Still alternatively, the comparator 8 selects a plurality of first data sets having high degrees of similarity to the second data set and the screen creator 9 creates a plurality of respective setting screens using respective operation histories containing the plurality of first data sets. The controller 11 allows the display device 7 to display these plurality of setting screens with priority given to a setting screen having a larger number of uses of the operation history.

Still alternatively, the comparator 8 selects a plurality of first data sets having high degrees of similarity to the second data set and the screen creator 9 creates a plurality of respective setting screens using respective operation histories containing the plurality of first data sets. The controller 11 allows the display device 7 to display these plurality of setting screens with priority given to a setting screen having a later date and time of creation of the operation history.

The comparator 8 may dynamically change the weight for use in calculating the degree of similarity. For example, assume that a user has a tendency to more often use an operation history having a high degree of similarity in terms of picture item than those having high degrees of similarity in terms of graphic item, symbol item, and keyword item. In this case, the comparator 8 sets, for this user, the weight to the degree of similarity in terms of picture item at a larger value than the weights to the degrees of similarity in terms of the other items. Thus, the image forming apparatus 1 can preferentially display a setting screen based on an operation history having a high degree of similarity in terms of picture item. Hence, the image forming apparatus 1 can assist a user's copy operation with higher accuracy.

<Modification 3>

The screen creator 9 may not only allow a preview image of the second data set to be displayed on the setting screen, but also create display data indicating positions of similarity between the second data set and a past first data set and allows the display data to be displayed on the setting screen. For example, the screen creator 9 allows a graphic contained in a past first data set and similar to a graphic contained in the second data set generated by the image reading device 3 to be displayed on the setting screen. For another example, the screen creator 9 allows a keyword contained in a past first data set and similar to a keyword contained in the second data set generated by the image reading device 3 to be displayed on the setting screen.

For example, in creating a preview image in which a setting data set is reflected on the second data set, the screen creator 9 creates display data indicating positions of similarity between the second data set to the first data set and adds the display data, together with the preview image, into the setting screen, and the controller 11 allows the display device 7 to display the setting screen into which the preview image and the display data are added.

Furthermore, the screen creator 9 may highlight the positions of similarity to the past first data set on the preview image of the second data set.

When the image forming apparatus 1 displays the positions of similarity, the user can easily visually recognize which first data set is contained in an operation history applied to the second data set. As a result, for example, in the case where the user does not want to apply an operation history containing a certain first data set to the second data set even if the first data set has a high degree of similarity to the second data set, the user can easily determine whether to apply the operation history containing the first data set to the second data set.

INDUSTRIAL APPLICABILITY

The present disclosure can be applied to various image forming apparatuses regardless of whether they are for home use or for professional use.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
an image forming device that forms an image on a sheet;
a storage device that stores an operation history in which at least one of four types of data, picture, graphic, symbol, and keyword, contained in a first data set used when the image forming device has formed the image on the sheet is associated with a setting data set manipulated by a user during formation of the image on the sheet;
an image reading device that reads an original document for use in forming an image and generates a second data set on the read original document;
a display device; and
a control device that includes a processor and functions, through the processor executing a control program, as
a comparator that makes a comparison between at least one of four types of data, picture, graphic, symbol, and keyword, contained in the second data set generated by the image reading device and at least one of the four types of data, picture, graphic, symbol, and keyword, contained in each of the first data sets stored in the storage device and selects the first data set consistent with the second data set,
a screen creator that uses the setting data set associated with the first data set consistent with the second data set to create a setting screen for use in accepting an instruction to set image formation details for formation of the image using the second data set, and
a controller that allows the display device to display the setting screen created by the screen creator, wherein
when all of the respective first data sets contained in the operation histories stored in the storage device are inconsistent with the second data set, the comparator calculates a degree of similarity of each of the first data sets to the second data set, and
the screen creator uses the setting data set associated with the first data set having a highest degree of similarity to the second data set to create the setting screen, wherein
when the degree of similarity of the first data set having a highest degree of similarity to the second data set is smaller than a predetermined threshold, the screen creator avoids creating a setting screen using the setting data set associated with the first data set having a highest degree of similarity to the second data set and instead creates an initial setting screen indicating default values of the image formation details.

2. The image forming apparatus according to claim 1, wherein
the control device further functions, through the processor executing the control program, as an authenticator that authenticates a user,
the storage device stores the operation history on a basis of each user authenticated by the authenticator, and
the comparator uses the operation history for the user authenticated by the authenticator to make the comparison and select the first data set consistent with the second data set.

3. The image forming apparatus according to claim 1, wherein
the screen creator creates a preview image in which the setting data set is reflected on the second data set, and adds the preview image into the setting screen, and
the display device displays the setting screen into which the preview image has been added.

4. The image forming apparatus according to claim 1, wherein
in creating a preview image in which the setting data set is reflected on the second data set, the screen creator creates display data indicating a position of similarity between the second data set and the first data set and adds the display data, together with the preview image, into the setting screen, and
the display device displays the setting screen into which the preview image and the display data have been added.

5. An image forming apparatus comprising:
an image forming device that forms an image on a sheet;
a storage device that stores an operation history in which at least one of four types of data, picture, graphic, symbol, and keyword, contained in a first data set used when the image forming device has formed the image on the sheet is associated with a setting data set manipulated by a user during formation of the image on the sheet;
an image reading device that reads an original document for use in forming an image and generates a second data set on the read original document;
a display device; and
a control device that includes a processor and functions, through the processor executing a control program, as
a comparator that makes a comparison between at least one of four types of data, picture, graphic, symbol, and keyword, contained in the second data set generated by the image reading device and at least one of the four types of data, picture, graphic, symbol, and keyword, contained in each of the first data sets stored in the storage device and selects the first data set consistent with the second data set,
a screen creator that uses the setting data set associated with the first data set consistent with the second data set to create a setting screen for use in accepting an instruction to set image formation details for formation of the image using the second data set, and
a controller that allows the display device to display the setting screen created by the screen creator, wherein
the comparator selects all the first data sets having higher degrees of similarity to the second data set than a predetermined value,
the screen creator creates respective setting screens using the respective setting data sets associated with the selected first data sets and allows the display device to display the created respective setting screens in descending order of the degree of similarity,
for each of the displayed setting screens, the comparator calculates the respective degrees of similarity in terms of four items, picture, graphic, symbol, and keyword, contained in the first data set used in creating the setting screen, and stores, among the four items of the setting screen manipulated by the user, an item having a highest degree of similarity as a notable item, and
in allowing the display device to display the created respective setting screens next time, the controller allows the display device to sequentially display the setting screens in order first from the setting screen created using the first data set having a highest degree of similarity in terms of the notable item stored in the comparator.

* * * * *